United States Patent [19]

Faulkner, III

[11] Patent Number: 4,641,764

[45] Date of Patent: Feb. 10, 1987

[54] VISCOUS THERMOPLASTIC MELTING AND DISPENSING UNIT

[75] Inventor: W. Harrison Faulkner, III, Pacific Grove, Calif.

[73] Assignee: Slautterback Corporation, Monterey, Calif.

[21] Appl. No.: 732,425

[22] Filed: May 9, 1985

[51] Int. Cl.$^4$ .............................................. E67D 5/62
[52] U.S. Cl. .................... 222/146.2; 222/277; 222/564; 126/343.5 A; 126/391; 219/385; 219/421
[58] Field of Search ................. 222/146.5, 146.2, 564, 222/377, 328, 547; 126/343.5 A, 343.5 R, 391; 219/420–424, 385

[56] References Cited

U.S. PATENT DOCUMENTS

| | | | |
|---|---|---|---|
| 1,089,860 | 3/1914 | Nystrom | 219/421 |
| 2,622,590 | 12/1952 | Corbet et al. | 126/343.5 |
| 2,898,628 | 8/1959 | Phipps | 126/343.5 |
| 3,531,023 | 4/1968 | Mercer | 222/146 |
| 3,598,282 | 8/1971 | Phillips | 222/146 HE |
| 3,773,069 | 11/1973 | Rebentisch | 137/341 |
| 3,964,645 | 6/1976 | Scholl | 222/146 HE |
| 4,091,967 | 5/1978 | Kinoshita | 222/328 |
| 4,162,880 | 7/1979 | Cobbs, Jr. et al. | 425/202 |
| 4,195,755 | 4/1980 | Slautterback et al. | 222/146 HE |
| 4,227,069 | 10/1980 | Gardner et al. | 219/421 |
| 4,383,821 | 5/1983 | Campbell | 126/343.5 |
| 4,505,669 | 3/1985 | Rogers | 219/420 |

FOREIGN PATENT DOCUMENTS 0175659 1/1953 Austria .......................... 126/343.5

Primary Examiner—Joseph J. Rolla
Assistant Examiner—Frederick R. Handren
Attorney, Agent, or Firm—Thomas Schneck

[57] ABSTRACT

A hot-melt tank having side walls and a bottom wall with a melt unit mounted on the bottom wall in the lower region of the tank, a melt zone. The melt unit includes a base mounted in the lower region and upwardly extending, spaced apart, parallel fins having a sloping upper end. The base does not block a material outflow port in the bottom wall of the tank, but is oriented so that the lowest portion of the sloping upper end of the fins is distal to the outflow port. A shelf, parallel to the bottom wall is positioned over the outflow port parallel to the base, intercepting the fins and secured thereto for blocking direct material inflow from the top of the tank into the outflow port. Rather, material flow is equalized in the lower region of the tank, being drawn to the outflow port from both short and long paths.

12 Claims, 6 Drawing Figures

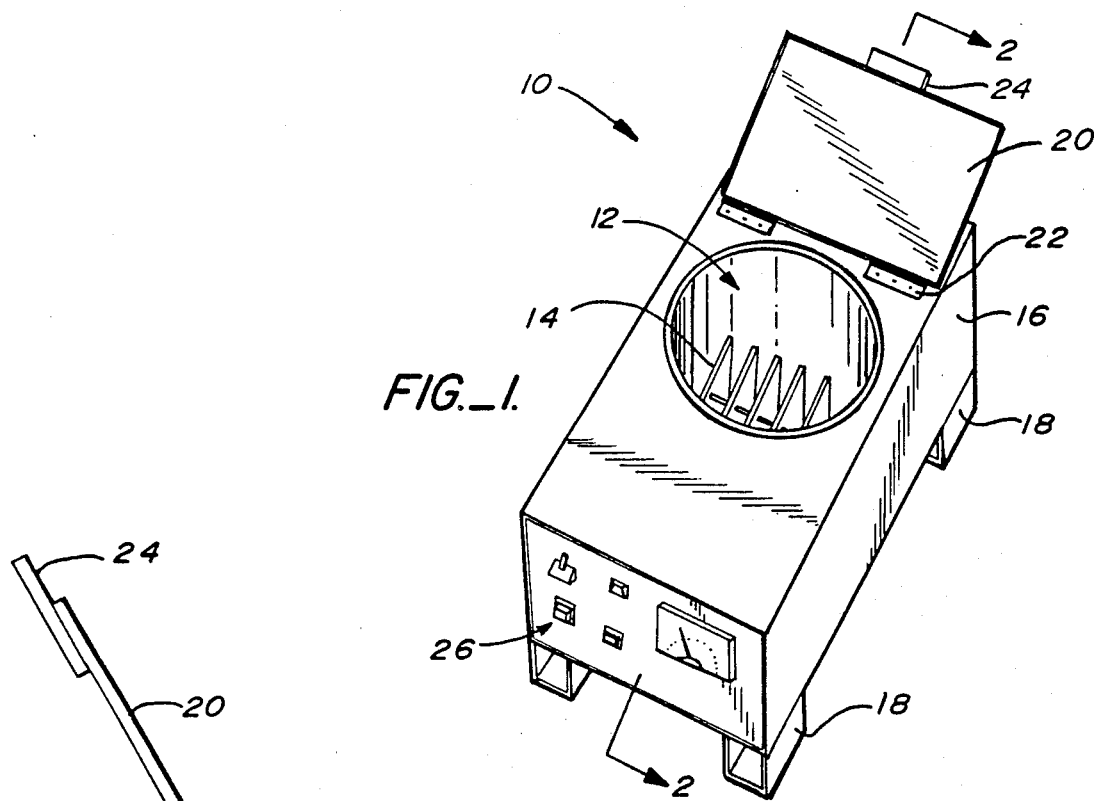
FIG._1.
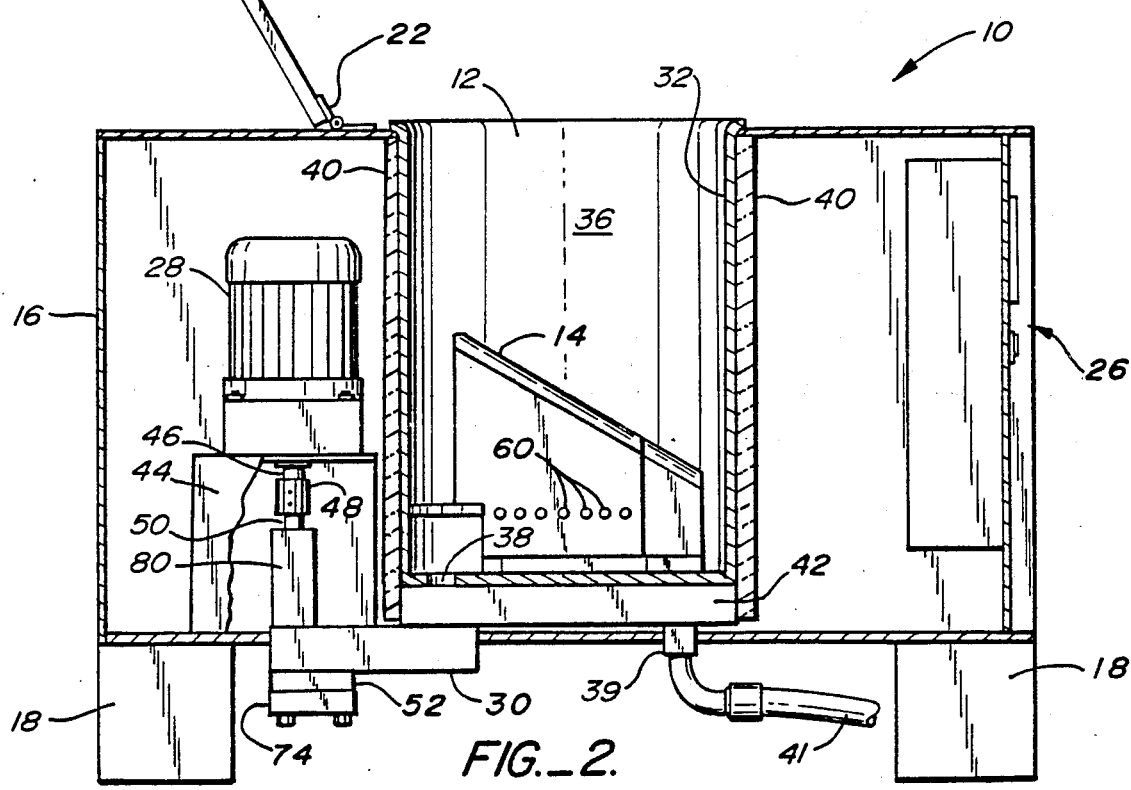
FIG._2.

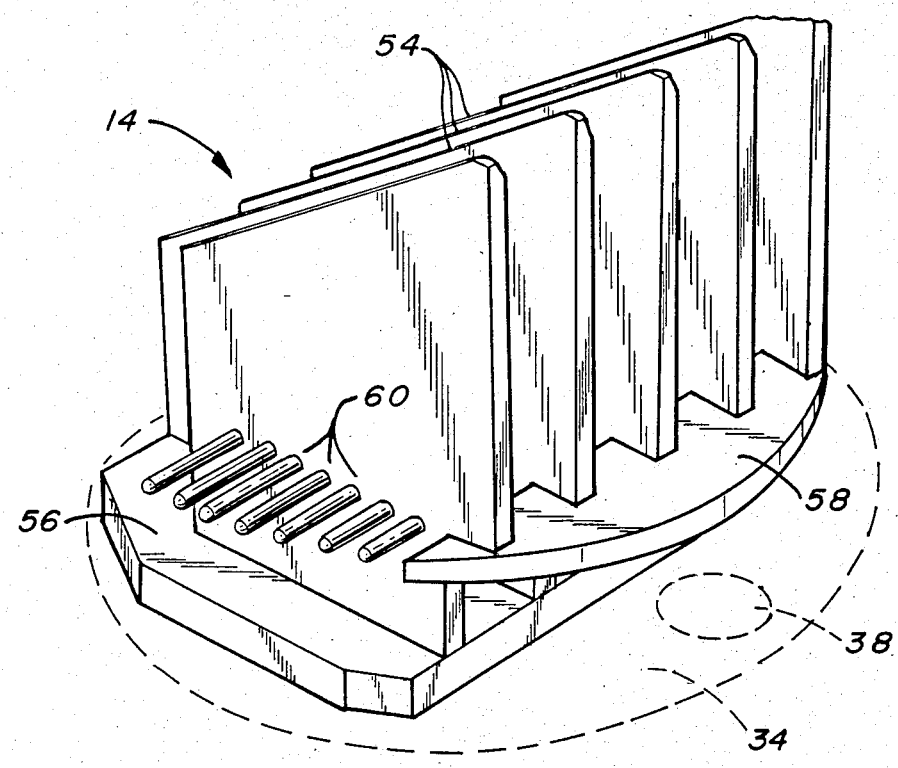
FIG._3.
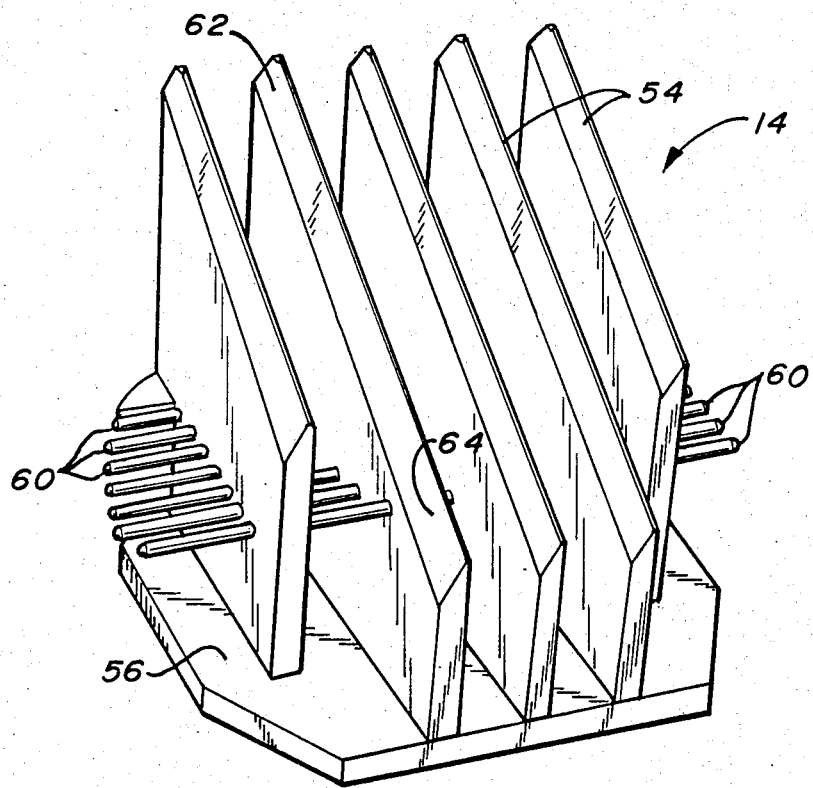
FIG._4.

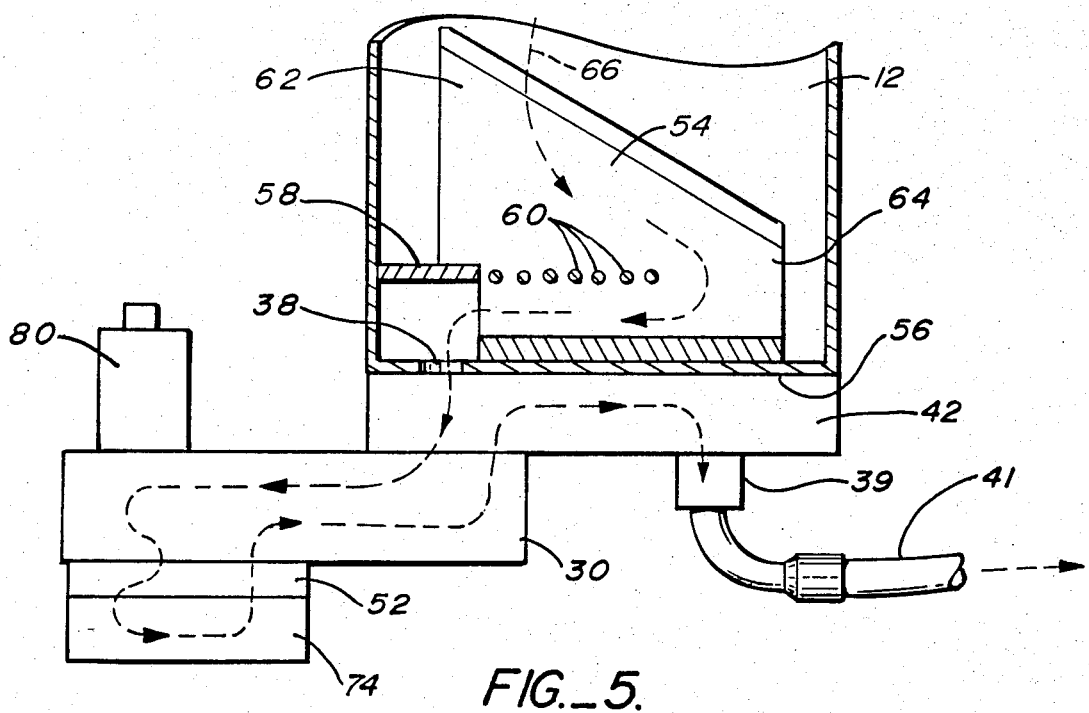
FIG._5.
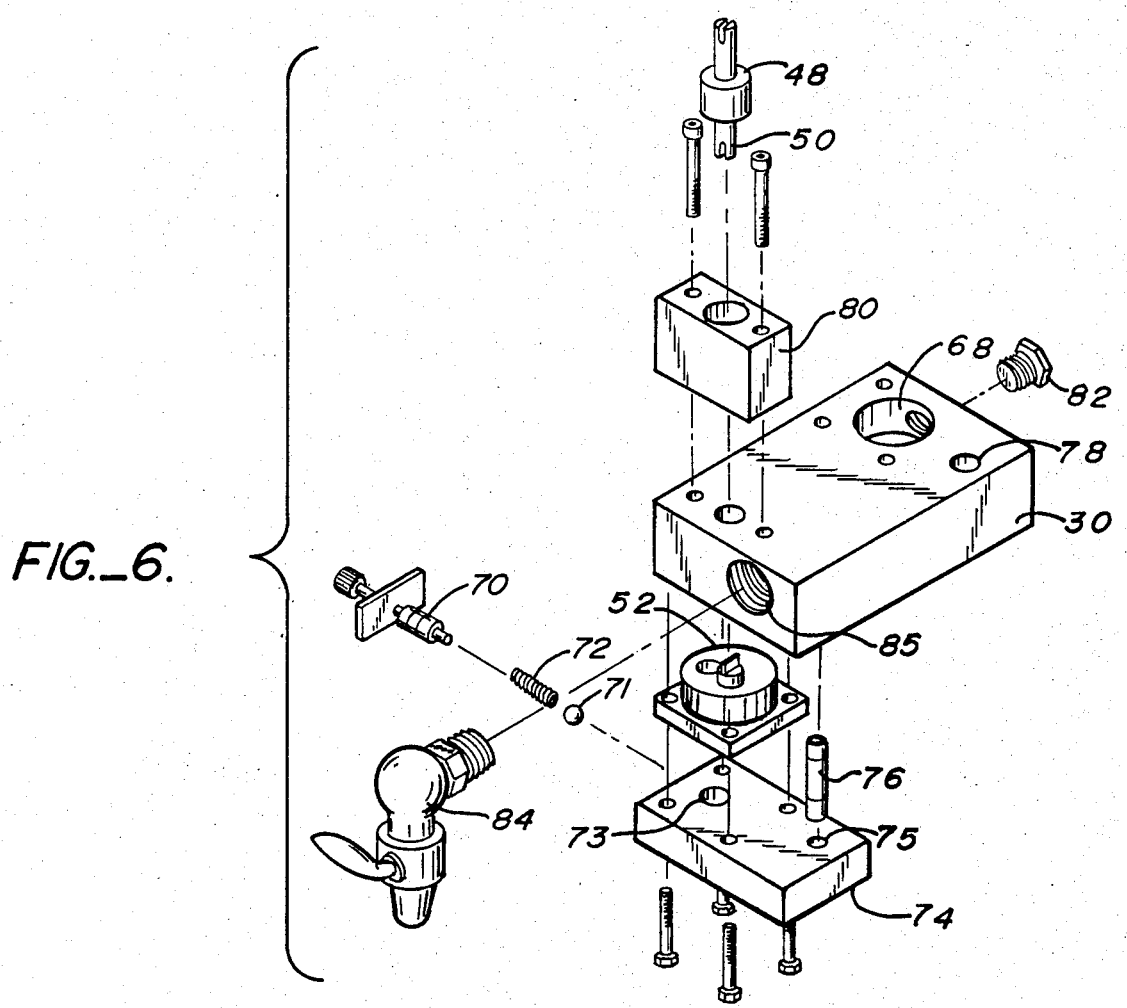
FIG._6.

VISCOUS THERMOPLASTIC MELTING AND DISPENSING UNIT

DESCRIPTION

1. Technical Field

This invention relates to apparatus for melting and dispensing high viscosity hot-melt material, such as low heat transfer rate thermoplastics, particularly sealants and adhesives, such as butyl rubber.

2. Background Art

It is well known that viscosity of thermoplastic material decreases with increasing temperature and pressure. In the field of hot-melt adhesives, small masses of thermoplastic material, solid at room temperature, are placed in a heating unit wherein walls of the unit transfer heat to the thermoplastic material, melting it. In U.S. Pat. No. 3,964,645 thermoplastic material is introduced through the top of a hopper, heated in a lower receptacle which is fed by the hopper and then removed by a pump at the bottom of the receptacle. The success of this apparatus is partially due to the fact that there is adequate heat transfer from the walls of the receptacle to the thermoplastics to the extent that acceptable flow characteristics are obtained in the material. There are some very high viscosity materials, such as butyl rubber, for which there is inadequate heat transfer from the walls of prior art melt units. For such substances, the melt time is unacceptably long, namely a few hours.

Various methods have been devised to speed up the heat transfer to the material. Spokes, paddles, vanes and propellers are provided to stir the material. However, the problem for high viscosity thermoplastic materials is such that such blades encounter too much flow resistance for effective operation. Spiral and chain-link conveyors increase heat transfer by moving the material, and also bring the melted material to the pump inlet. U.S. Pat. No. 3,598,282 to Phillips and U.S. Pat. No. 4,162,880 to Cobbs have inclined melting surfaces that carry the material by gravity towards the pump inlet.

In Russian Pat. SU-578393, heating units are hinged in rows by the walls of the chamber. These hinged heating units initially line the walls of the chamber and are initially in a flat position. Upon loading lumps of a material to be melted, the heaters are switched on and lifted, increasing heat transfer. Simultaneously, the melt is stirred by a propeller.

The problem with these devices when used with high viscosity material, is that a vortex forms above the pump hole and the pump begins to pump air in a relatively short time. This problem is aggravated by the various stirring methods.

An object of the invention was to devise an efficient heat transfer unit for melting and dispensing high viscosity thermoplastic materials, such as butyl.

A further object of the invention was to avoid creating a vortex so that air is not pumped.

A still further object was to devise a hot-melt unit where the hottest material is pumped first.

Another object was to provide a pump inlet for a hot-melt unit which would not be blocked by chunks of cold material.

DISCLOSURE OF INVENTION

The object was achieved by providing a hot-melt supply tank with equalized hot-melt material flow to the pump hole. Flow is equalized by use of sloping fins with the highest part of the fins directly over the material outlet hole in the tank bottom wall, and the lowest part of the fins directly opposite the hole. Thus, new material is fed opposite the hole. The fins are connected by solid rods which block solid material from flowing into the hole. A shelf covers the hole so that no vortex may form directly above the hole. The fins have significant mass and are made of thermally conductive material, thereby storing heat transferred from the base of the tank for melting solid melt material.

BRIEF DESCRIPTION OF THE DRAWINGS

FIG. 1 is a top perspective view of the apparatus of the present invention.

FIG. 2 is a side sectional view of the apparatus taken along lines 2—2 of FIG. 1.

FIG. 3 is a perspective view of the melt grid unit shown in FIG. 1.

FIG. 4 is another perspective view of the melt grid unit shown in FIG. 1.

FIG. 5 diagrams the flow of thermoplastic through the melt grid unit of FIGS. 3 and 4.

FIG. 6 is an exploded view of the pump block assembly illustrated in FIG. 2.

BEST MODE FOR CARRYING OUT THE INVENTION

With reference to FIG. 1, a hot-melt supply unit 10 has a tank 12 for containing very high viscosity thermoplastic material, such as butyl rubber. A massive melt grid 14 sits at the bottom of the tank 12 and transfers heat to the thermoplastic. A metal box chassis 16, having legs 18 to support the chassis 16 off the ground, isolates the working parts from the user. The unit has a lid 20 attached with hinges 22 to the top of the chassis 16. The lid 20 has a handle 24, so that the lid may be opened to fill the tank 12 with thermoplastic. A front panel 26, having on/off switches and a temperature meter, allows the user to easily operate the unit 10.

FIG. 2 shows a cross section of the hot melt supply unit 10. In addition to the tank 12 containing the melt grid 14, the motor 28 and the pump block 30 are visible. The tank 12 has a vertical side wall 32 of generally cylindrical form and a base 42 which cooperates with the tank side wall 32 to form an impervious cylindrical chamber 36. Tank side wall 32 and tank base 42 are constructed of aluminum or like material of high heat conductivity. The tank can be formed by welding the tank base 42 to the lower edge of the tank side wall 32, or the two can be cast as one integral structure.

The upper edge of the side wall 32 defines a top opening for material entry into the chamber 36. Typically, the tank has a capacity of about 30 pounds of thermoplastic material. An outlet port 38 is bored through the tank base 42 near one edge of the tank 12. The pump block 30 is connected to the tank 12 under the tank outlet port. Melted thermoplastic flows out of the tank, through the tank outlet port 38, and into the pump block 30. From there, the material flows back up through the tank base to hose connection 39. The flow path is indicated by dashed lines in FIG. 5. Returning to FIG. 2, the tank side wall 32 is covered by insulating material to hold in the heat. A cartridge heater transfers heat through the tank base 42 to the melt grid 14. Typically, the temperature is 400° to 450° F. (204° to 232° C.).

FIG. 2 shows a motor 28 bolted to a motor mount 44, which in turn is bolted to the chassis 16. The motor drives a gear pump 52 in the pump block 30. The motor 28 connects to the pump 52 via a motor coupling 46, a bearing 48, and a drive shaft 50. The melt unit 10 for very high viscosity thermoplastics typically uses a 57 RPM, 120 volt motor.

In FIGS. 3 and 4, two views of the melt grid 14 are seen. The melt grid 14 has a plurality of sloping fins 54 extending vertically from a base 56. The fins 54 are vertical, parallel, and spaced apart. Typically, the number of fins is five. The fins increase the surface area for melting. The fins 54 are sloped, having a taller end 62 and a shorter end 64. The taller end 62 is over the tank outlet port 38, while the shorter end 64 is on the side opposite the tank outlet port 38. The grid base 56 is bonded to the tank base 34. The fins 54 are sloped to make large chunks of melt material move to the back of the unit, sliding down from the taller end 62, away from the inlet, in addition to promoting even drawing of the least viscous or hottest material to the pump inlet.

The melt grid 14 has a shelf 58 horizontally disposed on the taller end of the fins 62 and spaced above the tank output port 38. The shelf 58 blocks unmelted thermoplastic material that may clog the pump block from falling through the output port 38. The melt grid 14 also has a plurality of rods 60 which are horizontal, parallel, spaced apart, and cross through the fins 54. The rods are preferably solid, having a preferred diameter of about ¼ inch and are axially spaced from each other by about ½ inch. The rods should be greater than a minimum diameter of 1/16 inch. The rods 60 are spaced above the grid base 56 on the same level as the shelf 58. The rods 60 are typically made of aluminum or copper or copper clad steel or some other heat conducting metal so that the rods can promote heat distribution over the lower region where they are supported. The high viscosity thermoplastic material to be melted has a characteristic dimension. The rods 60 have a separation from each other of less than this characteristic dimension. They resist the movement of melted viscous thermoplastic directly toward the output port 38 and so prevent the formation of a vortex. The rods 60 also ensure even distribution of heat to the fins 54.

FIG. 5 diagrams the flow of thermoplastic material 66 through the melt grid. Unmelted thermoplastic material 66 comes in contact with the hot surface of the fins 54 and is heated by conduction until it melts. The melted thermoplastic material 66 flows downward but direct flow to the outlet port is resisted by the shelf 58 and the rods 60. The material 66 flows toward the low end 64 of the fins 54 until there are no rods 60 in the way. The thermoplastic material 66 then flows along the grid base 56 under the rods 60 and shelf 58 toward the outlet port 38. Material then flows to pump 52 and then to lower block 74 which prevents air from entering the material. Material then is pumped up through pump block 30 to a channel extending through pump base 42 and then to hose connection 39 and heated hose 41.

FIG. 6 shows the parts of the pump block assembly. Melted thermoplastic material flows into the pump block 30 through the pump block inlet 68, then along an interior channel not shown to the gear pump 52. The pump gears are driven by the motor via a bearing 48, in a bearing block 80, and a drive shaft 50. Thermoplastic material leaving the pump 52 enters the lower block 74 through a hole 73 and leaves through another hole 75. The movement of material is controlled by a flow control valve, made up of a piston 70, a spring 72, and a ball 71. Thermoplastic material reenters the pump block 30 through a connection piece 76 and continues along a second interior channel, not shown, in the pump block 30 to the pump block outlet 78, connected to a bore in the base of the melt unit. The bore leads to hose connection 39, seen in FIG. 1, thence to hose 41.

The pump block 30 and pump 52 are heated by conduction from the tank base to prevent the solidification of the thermoplastic material. A plug 82 connects to a hole in the pump block inlet 68. Alternatively, a drain valve may be provided for that hole. An identical valve, called a purge valve 84, connects to a hole 85 in the pump block. This valve 84 removes air from the pump 52 and lower block 74 so that air does not enter the dispensing hose, not part of the present invention.

In the present invention, flow of hot melt to the pump hole is equalized by providing impedance to the flow of material, especially over short paths to the pump hole. Cooperating structures, such as sloping fins, transverse rods and a shelf over the pump hole provide an appropriate amount of impedance for flow equalization. Material is now drawn to the pump hole from long paths as well as short paths, thereby operating a hot-melt dispensing unit more efficiently.

I claim:
1. A hot-melt supply unit comprising,
   a heated tank means for melting solid hot melt, the tank having a lower region holding fluid melt with a material outflow port and an upper region with a solid material intake port, the tank having an upright sidewall and a bottom wall which is imperforate except for the outflow port which extends through the bottom wall at a location near the sidewall, and
   a melt grid means disposed in said tank for providing material flow equalization to said outflow port, the grid means having a plurality of structures providing impedance to the flow of hot melt material over short paths to the material outflow port, said structures including a plurality of upright, parallel fins, said fins having top edges which slope downwardly from a higher end to a lower end, said higher end being located adjacent to said material outflow port, said lower end being located above the imperforate portion of the bottom wall and distal to said material outflow port.

2. The hot-melt supply unit of claim 1 wherein said structures include a plurality of parallel, spaced apart, horizontal heat conducting rods supported in said lower region, the rods being spaced apart from each other by less than a characteristic dimension of said solid hot-melt.

3. The hot-melt supply unit of claim 1 wherein said structures include a shelf supported in said lower region at the higher end of said fins directly over the material outflow port.

4. The hot-melt supply unit of claim 1 wherein said fins are heated.

5. The supply unit of claim 1 further defined by a pump block fixed below said tank, said pump block having an inlet port in communication with the material outflow port of the tank and an outlet port, said pump block operatively associated with a pump means for causing material flow from said inlet port to said outlet port.

6. For melting and dispensing high viscosity thermoplastic material having a characteristic dimension, a hot melt supply unit comprising,
   a tank having a generally vertical side wall of cylindrical form and a tank bottom wall which cooperate to define an impervious cylindrical chamber, said chamber having a top opening for material entry into said chamber, said tank having a heater associated with the tank bottom wall, a pump block fixed below said tank bottom wall and being operatively connected to a pump, said pump block having an inlet port in communication with said chamber and an outlet port, and a massive melt unit for applying heat energy to said thermoplastic material disposed in said chamber, said melt unit being composed of a plurality of fins, vertical, parallel, spaced apart, and extending from a horizontal base, said fins having top edges which slope downwardly from a higher end to a lower end, said fins having a shelf horizontally disposed on said higher end of said fins, said shelf being spaced above said inlet port of said pump block, said lower end being distal to said inlet port of said pump block compared to the higher end.

7. The unit of claim 6, wherein said fins have a plurality of rods for resisting the flow of thermoplastic material, horizontal, parallel, spaced apart, and crossing through said fins, said rods being spaced above said base but below the inlet port and having a separation from each other of less than a characteristic dimension of said thermoplastic material.

8. The unit of claim 6, wherein said melt unit is heated by said heater.

9. In a hot melt supply unit of the type having a heated tank with a material intake port near the top of the tank and a material, outflow port at a bottom wall of the tank, the improvement comprising, a base having a plurality of upstanding parallel fins extending therefrom within said tank, said base joined to the bottom wall of said tank, said fins having top edges which slope downwardly from a higher end to a lower end, said fins having a shelf horizontally disposed in transverse relation to said fins on the higher end of said fins, said shelf being positioned above said tank outlet port, the lower end being distal to said outflow port relative to the higher end.

10. The unit of claim 9 wherein said fins have a plurality of parallel, spaced apart rods extending therethrough, the rods providing a resistance to the flow of hot-melt material therethrough.

11. The unit of claim 10 wherein said rods lie in a parallel plane.

12. The unit of claim 9 wherein said fins are heated.

* * * * *